Figure 1:
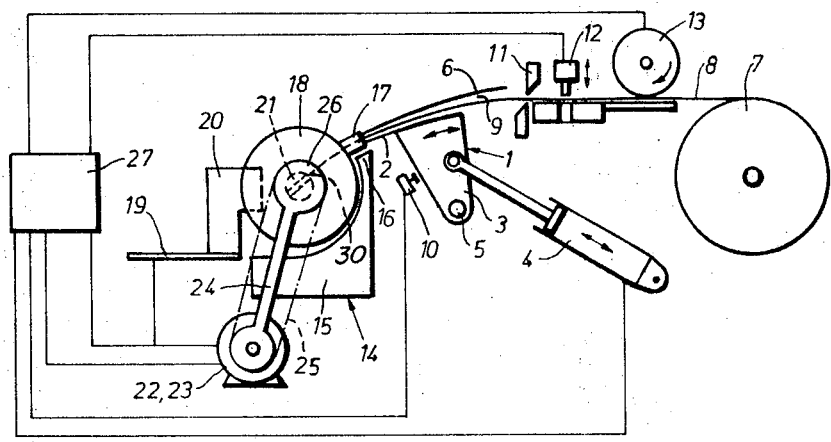

United States Patent

[11] 3,586,258

| [72] | Inventor | Oskar Horlezeder<br>Munich, Germany |
|---|---|---|
| [21] | Appl. No. | 818,310 |
| [22] | Filed | Apr. 22, 1969 |
| [45] | Patented | June 22, 1971 |
| [73] | Assignee | Agfa-Gevaert Aktiengesellschaft<br>Leverkusen, Germany |
| [32] | Priority | Apr. 27, 1968 |
| [33] | | Germany |
| [31] | | P 17 72 319.2 |

[54] METHOD OF AND AN APPARATUS FOR WINDING A PHOTOGRAPHIC FILM IN TAPE FORM ONTO A SPOOL ARRANGED INSIDE A CASSETTE
11 Claims, 2 Drawing Figs.

[52] U.S. Cl. .................................................. 242/197,
242/56, 242/56.8, 242/71.1, 242/71.7, 242/79
[51] Int. Cl. ...................................................... G11b 23/10,
B65h 75/28
[50] Field of Search .......................................... 242/71.7,
56, 74, 71.1, 210, 181

[56] References Cited
UNITED STATES PATENTS
| 2,205,052 | 6/1940 | Stein | 242/71.7 UX |
| 2,359,612 | 10/1944 | Bolsey | 242/71.7 X |
| 3,222,007 | 12/1965 | Scmuck | 242/71 |

*Primary Examiner*—George F. Mautz
*Assistant Examiner*—Milton Gerstein
*Attorney*—Connolly and Hutz ABSTRACT: A method is provided for winding a photographic film into a spool with fastening elements for the end of the film on its core. The spool is rotatably mounted in a cassette with a slotlike opening. The opening and the end of the film are brought together into the insertion position with the fastening element on the spool core aligned with the opening. A guide tongue is then inserted within the slot and the end of the film is introduced into it and through the opening into contact and securement with the spool core. Then the guide tongue is withdrawn and a suitable length of the film is wound on the spool.

PATENTED JUN22 1971 3,586,258

INVENTOR.
OSKAR HÖRLEZEDER

BY Connolly and Hutz
his attorneys

METHOD OF AND AN APPARATUS FOR WINDING A PHOTOGRAPHIC FILM IN TAPE FORM ONTO A SPOOL ARRANGED INSIDE A CASSETTE

This invention relates to a method and an apparatus for winding a photographic film in tape form onto a spool which on its core has a fastening element for the end of the film and which is rotatably mounted in a cassette with an opening in the form of a slot, the slot and the end of the film being brought into the insertion position whilst the fastening element on the spool core is directed towards the slot opening, after which the end of the film is inserted into the slot, fastened to the spool and then the film is wound.

Instead of winding the films outside the cassettes or cartridges onto the spools and subsequently inserting them into the cassettes or cartridges, it has already been proposed to provide the spool core with a flattened portion whose function is to initiate the operation by which the end of the film is fastened to the fastening element provided on the spool core when the end of the film is inserted into the slot of the cassette oppositely to the spool introduced into it. To this end, the flattened portion is brought into a specific position relative to the slot opening in such a way that the end of the film subsequently introduced comes into contact with the flattened portion. On completion of this operation, the spool is turned until the end of the film jumps into the slot provided in the spool core in which engaging hooks are arranged. The film can then be fed in so that its end provided with a hole fits onto the engaging hook. This manipulation understandably involves many uncertainties and in many cases the end of the film is not fastened which adversely affects production and causes waste.

It has now been found that according to the invention these disadvantages can be obviated by introducing a guide tongue into the slotlike opening of the cassette, at the latest when the end of the film is inserted, and removing it again at the earliest after the end of the film has been anchored to the spool core.

In this way, the inserted end of the film is able to slide on the guide tongue exactly towards the fastening element arranged on the spool core. Fastening elements of the kind in question consist for example of hooks and prongs which, although enabling the end of the flexible film to be fastened to them, do not allow it to be released without special aids or manipulations.

According to the invention, it is possible simultaneously to introduce the end of the film with the guide tongue, for which purpose the end of the film can be secured firmly to the guide tongue. Providing the end of the tongue is specially shaped, for example in the form of a double crest, and the fastening element on the spool core is shaped accordingly, the guide tongue can insert the end of the film directly into the fastening element.

In another embodiment of the invention, the guide tongue is initially inserted into the cassette slot and the end of the film is subsequently fed in. In this case, it is less important whether the guide tongue is removed immediately after the end of the film has been fastened or whether it is removed during or after winding of the film.

The apparatus for carrying out the method according to the invention can naturally be designed in many different ways. In particular, it may be designed in such a way as to enable the sequence of operations to be controlled substantially automatically.

One simple embodiment of the apparatus according to the invention comprises a means for positioning the cassette cooperating with a means for introducing the film, consisting of a guide tongue displaceable towards the cassette-positioning means and a means for inserting the film. The means for positioning the cassette essentially comprises only a snug-fit mounting for the cassette and slotlike opening which occupies a specific position relative to the position and direction of movement of the guide tongue. When inserted into the slot, the guide tongue preferably describes an arcuate movement because a movement such as this is the easiest to obtain with technical means. The film is delivered with advantage by means of rollers or a pair of rollers.

In one particular embodiment of the invention, the means for positioning the cassette is advantageously provided with a spool aligning means so that the spool is aligned with the fastening element towards the slot in the working cycle. In another advantageous embodiment, the apparatus has a spool drive means for winding the film.

It is of particular advantage to make the spool-aligning means and the spool drive means as a single unit which performs both functions through appropriate control or switching devices.

In order further to automate the working cycle, the cassette-positioning means is preferably provided with a conveyor belt. In this case, the slot is aligned very simply and to advantage by means of guide rails.

In another particular embodiment, it is of advantage to provide the guide tongue with a cover guide, so that the film sliding between these elements cannot be pushed up. This cover may be displaceable together with the guide tongue. There are other advantageous possibilities for the design of the guide tongue. For example, it may be in the form of a flat guide tube or may consist of two U-sections arranged horizontally with their arms pointing towards one another, guiding only the edges of the film. This prevents the photographic layer from being scratched.

Depending on the embodiment, the invention enables films of precut length or even endless films to be wound from supply rollers. In the latter case, the apparatus is advantageously coupled to a cutter unit in order to cut the film into suitable lengths. Similarly, a punching means may be provided for punching an anchoring hole in the end of the film, providing the fastening elements on the spool core requires such perforation.

As already mentioned, the apparatus can be made to function more or less automatically. Accordingly, in a special embodiment, at least two of the individual units or drives are coupled synchronously together through a control system.

Figure 2:
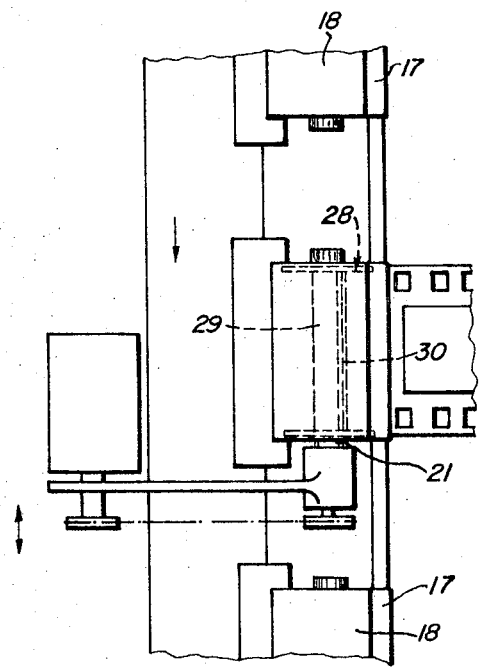

One embodiment of the invention and its operating cycle is shown diagrammatically by way of example in the accompanying drawing, wherein:

FIG. 1 is a side elevation of the apparatus.
FIG. 2 is a plan view of the apparatus.

The means 1 for introducing the film consists essentially of the guide tongue 2 arranged on a pivoting segment 3 which is actuated by means of an adjustment mechanism 4 and is pivotable about a pin 5. The guide tongue 2 is provided with a cover guide 6 so that the film 8 coming from the supply roll 7 has to pass through the gap 9 and cannot be deflected upwards. The reference 10 denotes a limit switch. A cutting means 11 and a punching means 12 are also provided for cutting and perforating the film 8. The film is supplied from a delivery roller 13.

A cassette-positioning means 14 is provided in a suitable position relative to the means 1 for introducing the film and the guide tongue 2. In this example, the cassette-positioning means is in the form of a guide rail 15 whose upper edge 16 simultaneously forms the contact guide for the slot 17 of the cassette 18. The conveyor belt 19 is provided with conveying means 20 for the cassettes 18. The spools 28 accommodated in the cassettes 18 whose keys 21 project are aligned by an aligning means 22 which by switching over can also be made to act as the spool drive means 23 for winding the film 8. For this purpose, the lever arm 24 is displaceable longitudinally in the direction of travel of the conveyor belt 19 together with an adapter 26 driven by way of a belt or a chain 25, and can also be swung back to allow the conveyor belt 19 to move forwards. All the individual devices and their drives are coupled synchronously together through a control unit 27.

The working cycle is described in the following with reference to the apparatus described above:

The apparatus as a whole functions in a timed cycle. The cassettes 18 are placed in the conveying elements 20 at a feeder station and are carried to the means 1 for inserting the film. The fate of a given cassette 18 is as follows: While it is being carried, the cassette slot 17 is aligned by the upper edge 16 of the guide rail 15. Once the cassette 18 is in position exactly in front of the film-inserting means 1, the conveyor belt 19 stops. The lever arm 24 of the spool-aligning means 22 is swung into the path of the conveyor and pushed onto the key 21 of the film spool 28. The film spool 28 is turned relative to the fastening elements arranged on the spool core 29 in such a way that the fastening elements 30 are in position ready to receive the end of the film 8. The adjusting mechanism 4 of the pivoting segment 3 is then actuated and the guide tongue 2 is inserted into the cassette slot 17. At the same time, the pivoting segment strikes the limit switch 10, as a result of which the film feed 13 is actuated through the control device 27, taking the film 8 from the supply roll 7 and inserting it through the gap 9 between the cover guide 6 and the guide tongue 2 into the cassette slot 17. The end of the film with a hole punched in it hooks into the fastening elements on the spool core. The film delivery roller 13 is then stopped and raised. At the same time, the guide tongue 2 is removed from the cassette slot 17 and the spool-aligning means 22 is converted into a spool drive means 23 and winds a suitable length of film 8. The apparatus 23 is briefly switched off so that the film 8 can be cut by means of the cutter unit 11, and an anchoring hole is simultaneously punched into the insertion end of the remaining film 8 by means of a punch 12. That end of the film 8 projecting from the cassette slot 17 is then wound up. After the lever arm 24 of the spool drive means 22, 23 has swung back. The loaded cassette 18 is carried on by the conveyor belt 19 and subsequently taken off or ejected.

A competent expert will appreciate that the apparatus described by way of example lends itself to numerous more or less extensive modifications which fall within the scope of the invention.

In particular, simpler embodiments of the apparatus can also be operated semiautomatically, in which case the missing control means have to be replaced by manual operation.

I claim:

1. A method of winding a photographic film in tape form onto a spool which on its core has a fastening element for the end of the film and which is rotatably mounted in a cassette provided with a slotlike opening, the slotlike opening and the end of the film being brought into the insertion position whilst the fastening element on the spool core is aligned towards the slot, after which the end of the film is inserted into the slot and fastened to the spool and the film is wound up, wherein a guide tongue is inserted into the slot at the latest when the end of the film is introduced and is removed again at the earliest after the end of the film has been fastened to the spool core.

2. A method as claimed in claim 1, wherein the guide tongue is inserted together with the end of the film.

3. An apparatus for carrying out the method of claim 1, comprising a means (14) for positioning the cassette cooperating with a means (1) for inserting the film consisting of a guide tongue (2) displaceable towards the cassette-positioning means (14), and a film-delivery or -feed means (13).

4. An apparatus as claimed in claim 3, wherein the cassette-positioning means (14) is provided with a spool-aligning means (22).

5. An apparatus as claimed in claim 3, comprising a means (23) for driving the spool.

6. An apparatus as claimed in claim 3, wherein the cassette-positioning means (14) is provided with a conveyor belt (19).

7. An apparatus as claimed in claim 3, wherein the guide tongue (2) is provided with a cover guide (6).

8. An apparatus as claimed in claim 3, wherein the cover guide (6) is displaceable together with the guide tongue (2).

9. An apparatus as claimed in claim 3, wherein the means (1) for inserting the film is coupled with a cutter unit (11).

10. An apparatus as claimed in claim 3, wherein the means (1) for inserting the film is provided with a punching means (12).

11. An apparatus as claimed in claim 3, wherein at least two of the individual devices or drive (1, 4, 6, 11, 12, 13, 14, 19, 22, 23, 24, 25, 26) are synchronously coupled through a control unit (27).